US012688028B2

(12) United States Patent
Ruau et al.

(10) Patent No.: US 12,688,028 B2
(45) Date of Patent: Jul. 21, 2026

(54) SOFTWARE UPDATE IN A SECURITY ELEMENT

(71) Applicant: GIESECKE+DEVRIENT MOBILE SECURITY GERMAnY GMBH, Munich (DE)

(72) Inventors: Mariano Ruau, L'Hospitalet de Llobregat (ES); Clara Gifre, Barcelona (ES); Andreu Garcia Farres, Sant Quirze del Vallés (ES); Pablo Daniel Gomez Sol, Barcelona (ES)

(73) Assignee: GIESECKE+DEVRIENT MOBILE SECURITY GERMANY GMBH, Munich (DE)

( * ) Notice: Subject to any disclaimer, the term of this patent is extended or adjusted under 35 U.S.C. 154(b) by 234 days.

(21) Appl. No.: 18/292,443

(22) PCT Filed: Jul. 26, 2022

(86) PCT No.: PCT/EP2022/025349
§ 371 (c)(1),
(2) Date: Jan. 26, 2024

(87) PCT Pub. No.: WO2023/006246
PCT Pub. Date: Feb. 2, 2023

(65) Prior Publication Data
US 2025/0085956 A1      Mar. 13, 2025

(30) Foreign Application Priority Data

Jul. 28, 2021      (EP) .................................... 21382706

(51) Int. Cl.
G06F 8/65          (2018.01)
G06F 9/44          (2018.01)
(Continued)

(52) U.S. Cl.
CPC .............. G06F 8/65 (2013.01); G06F 21/602 (2013.01); G06F 21/6245 (2013.01)

(58) Field of Classification Search
CPC ...... G06F 8/65; G06F 21/602; G06F 21/6245; G06F 9/4401; G06F 21/45; G06F 21/73;
(Continued)

(56) References Cited

U.S. PATENT DOCUMENTS 10,069,633 B2      9/2018 Gulati et al.
10,303,463 B2 *    5/2019 Chu ........................ G06F 8/654
(Continued)

OTHER PUBLICATIONS

Extended European Search Report from corresponding EP Application No. 21382706.6, Nov. 23, 2021.
(Continued)

*Primary Examiner* — Thuy Dao
(74) *Attorney, Agent, or Firm* — Workman Nydegger

(57) ABSTRACT

A method for updating an installed software, in particular an operating system, OS, in a secure element includes the steps of providing an update agent in the secure element; securing specific data; required for operating the installed software; in a memory of the update agent; loading a software image; into the secure element, the software image representing an update of the installed software; and making the software image operable by the secured specific data. According to further aspects, a respective secure element, an update agent, and a computer-program product correspond to features of the aforementioned method.

16 Claims, 4 Drawing Sheets

(51) Int. Cl.

| | | |
|---|---|---|
| *G06F 9/455* | (2018.01) | |
| *G06F 21/57* | (2013.01) | |
| *G06F 21/60* | (2013.01) | |
| *G06F 21/62* | (2013.01) | |
| *G06F 21/72* | (2013.01) | |

(58) Field of Classification Search

CPC .......... G06F 9/4451; G06F 8/63; G06F 21/51; G06F 21/572; H04L 9/0631; H04L 9/3268; H04L 9/0891; H04L 67/34; H04L 67/10; H04W 8/22; H04W 4/50; H04W 8/245; H04M 3/42178

See application file for complete search history.

(56) References Cited

U.S. PATENT DOCUMENTS

| | | | |
|---|---|---|---|
| 10,936,719 B2 | 3/2021 | Sibert et al. | |
| 11,658,865 B2 * | 5/2023 | Zimny .................. | H04W 12/06 |
| | | | 709/220 |
| 2011/0124325 A1 * | 5/2011 | Choi-Grogan .......... | H04L 67/34 |
| | | | 455/419 |
| 2018/0089434 A1 | 3/2018 | Sibert et al. | |

OTHER PUBLICATIONS

International Search Report from corresponding PCT Application No. PCT/EP2022/025349, Oct. 18, 2022.

* cited by examiner

SOFTWARE UPDATE IN A SECURITY ELEMENT

The present invention relates to updating a software installed in a secure element and in particular to updating a personalized trusted software, for example an operating system of the secure element.

BACKGROUND OF THE INVENTION

Secure elements are widely used in a variety of systems such as mobile phones, smart cards, payment cards, access cards, to provide identification, authentication, data storage and application processing.

Where, for example, the smart card contains security-critical applications and sensitive data, such as in the case of payment cards and the like, a secure element is used to store the data. A secure element is a tamper resistant element, TRE, that provides a secure memory and an execution environment in which application code and application data can be securely stored and administered. The secure element ensures that access to the data stored on the card is provided only when authorized. Such a secure element may exist in any form factor such as UICC, embedded SE, smartSD, smart microSD, eSIM, etc.

A secure element may include, for example within a security domain, a collection of data, such as a firmware/an operating system, packages, applets, applications, including specific data required to operate the same, such as personalization data or the like, which are authenticated using security keys. The operating system and applications are stored within the secure element in volatile and non-volatile memory modules, and are executed in a secured processor of the secure element.

The specification Global Platform Card Technology Open Firmware Loader for Tamper resistant Elements v1.3 describes standardized mechanisms for loading firmware (that is, use case dependent data which may contain the operating system and application data) and personalization data into a secure element. In particular, an Image Trusted Loader, ITL, or update agent, provided inside the secure element is configured to receive an operation system image, to perform security checks—particularly authentication and integrity checks-on the image, and to trigger installation of the image contents into a memory of the secure element using specific data required to operate the image, so as to install in the secure element an operable operating system.

FIG. 1 shows a schematic representation of the conventional process of loading firmware (e.g., an operating system, OS) into a secure element. The upper row shows the entities responsible for the corresponding production phase (I, II, III, IV), while the lower row shows the content of the secure element (i.e., chip) in that particular production phase. During a first production phase I at a chip production site (i.e., the chip factory), the chip manufacturer provides for a secure element 100 to be loaded with trusted software, such as a secure operating system. At the chip production site, the trusted software is personalized with credentials 65a, which are specific data including keys or certificates and which, upon personalization, are stored in a personalized software image, e.g. a personalized operating system, OS, 30a referred to as "maxiInit" in FIG. 1. The trusted software or OS is personalized by specific commands, so called APDUs, that are send from an external personalization device at the chip production site to the secure element. The personalized software is finally loaded inside the chip.

The chip with its personalized software is then, at a device manufacturer's site, embedded in a portable card-like device, such as an (e) UICC or (e) SIM (phase II), or can be delivered to another device manufacturer's site to be included (phase III) in an electronic end device like a smart phone, a computer, a car, a measurement equipment, etc., and finally released to the market (phase IV). Note that if, at any stage of a chip's life cycle, a personalized trusted software needs to be amended or updated, the personalization data used to personalize the installed software to be amended or updated will be lost while, nevertheless, the amended or updated version, the respective software image, must be personalized.

Accordingly, there remains a need to enable updating a trusted software installed in a secure element which overcomes the above-mentioned drawbacks.

SUMMARY OF THE INVENTION

According to a first aspect of the present invention, there is provided a method for updating an installed software, in particular an operating system, OS, in a secure element, SE. The method comprises in a first step providing an update agent in the SE. In a further step, specific data required for operating the installed software, in particular the operating system, on the SE is secured in a specific memory of the update agent. Further, a software image is loaded into the SE that represents an update of and is meant to replace the installed software, in particular the operating system. In a final step, the software image is made operable by the secured specific data and replaces the installed software, in particular the operating system, as an update thereof.

Throughout this application the term "software" refers to any trusted software to be loaded and executed in the secure element. Examples of such software include firmware, an operating system (OS), and any other use-case dependent secure applications. The expression "software image" (or "OS image") refers to a generic data format encapsulating a software version and cryptographic data to be used by the operating system or an agent of the SE, such as the update agent according to the present invention.

Preferably, the specific data is not an integral part of the installed software or the software image but nevertheless is required for operating the installed software (and the software image once it is installed) and/or for installing the software image onto the secure element so that it can be executed. That is, without the specific data, the software image cannot be operated and/or installed as an update of the installed software and replace and/or update it.

The essence of the present invention is that by the update agent specific data associated with an installed software is reused or 'recycled' for rendering the software image operable without having to generate or securely obtain or handle a new set of specific data from an external entity within a certified environment. Because the update agent itself is a trusted, certified software, it can be seen as functional replacement of the certified environment at the chip manufacturer's site, because it enables to securely reuse or 'recycle' the specific data of the installed software when it is updated. By this, the specific data is kept within the secure element's secure environment and under the control of a trusted entity, namely the update agent, and cannot be tampered with, thus ensuring the integrity of the software image.

Within the context of the present invention, the notion of making the software image operable by the secured specific data includes any process that utilizes the specific data to the effect that the software image is not operable without the specific data. Making the software image operable thus means that the software image is correctly and operably installed on the secure element by using the specific data. That is, the presence of the specific data at a particular point of the process of installing the software image is a requirement for its proper functioning as an update of the installed software. This may involve the requirement to use the specific data upon installation of the software image or, preferably, the requirement to use the specific data upon personalization of the software image.

Therefore, preferably, the specific data comprises or consists of personalization data, particularly secure credentials and/or cryptographic keys, that are required to personalize the software image. Within that context, the present invention overcomes the conventional requirement to personalize a software image within a certified environment, thus widening the options to update a software installed on the secure element. In other words, the present invention allows for updating an installed software, particularly a trusted operating system of a secure element, outside of the chip manufacturer's site and independent of any certified environment in a secure fashion. Because the update agent provides the required level of security that conventionally the chip manufacturer's certified environment provides, reusing or 'recycling' personalization data of the installed software to be replaced is enabled.

The proposed method provides an efficient and secure solution for updating a trusted software independently of the conventional security concept. As a trusted software image that updates an installed software does not need to be personalized in the same way the installed software was personalized in the first place, a flexible solution for personalizing a software update at any time during the lifecycle of a secure element is provided. The suggested way of updating an installed software by an appropriate software image ensures that strictly confidential personalization data remain under strict safety conditions within the update agent and are thus protected from unauthorized modifications.

Preferably, the specific or sensitive data and/or personalization data is stored in a specific memory or memory structure of the update agent, such as a dedicated and secured segment of the non-volatile memory to which the update agent has exclusive access to.

In some embodiments of the present invention, the installed software has been personalized with the personalization data comprised in the specific data and the installed software is stored together with the specific data and/or personalization data in a memory area of the SE, where installed and/or executable software is stores, such as a non-volatile memory of the secure element.

The update agent secures the specific data and/or personalization data stored together with the installed software by copying or duplicating the specific data and/or personalization data to the specific memory of the update agent for later use. The specific data and/or personalization data is saved from deletion or degradation during the update process, e.g. by deleting the installed software together with its respective specific data and/or personalization data. Once the specific data and/or personalization data is secured in and/or copied to the specific memory of the update agent, the installed software can be updated, because it is only then possible to make a software image operable that represents an update of the installed software. Finally, the installed software is updated by personalizing the software image using the personalization data and/or by making the software image operable using the specific data stored in the specific memory of the update agent.

In some embodiments of the present invention, prior to installing, including making operable and/or personalizing the software image, the installed software is cancelled altogether, that is together with the specific data and/or personalization data that was used to make it operable. This includes cancelling any memory or memory area of the secure element in which the installed software or parts of it reside. For instance, in cases where the installed software to be updated is the operating system of the secure element, cancelling the complete operating system includes also cancelling all personalization data, OS-specific data, certificates, cryptographic keys, credentials and the like.

Once the software image, or the operating system image, is loaded onto the secure element for providing an update of the cancelled software, the specific data and/or personalization data secured in and by the update agent is required to make the loaded software image operable and/or to personalize it.

Because initially, an installed software, such as a trusted operating system of the SE, is made operable by specific data or personalized by personalization data during a first production phase of the SE, that specific data and/or personalization data is secured by the update agent during this initial production phase at a chip manufacturer's site. Therefore, the update agent, which itself is a trusted software, is loaded onto the SE and made operable/personalized by its specific data/personalization data also during the first production phase of the SE within the chip manufacturer's certified environment. This allows for securing specific data/personalization data of an installed software, such as a trusted operating system, by the update agent already at this early production phase.

According to some embodiments of the present invention, the update agent secures specific data and/or personalization data of a particular subset of the SE's installed software in its specific memory if and when the specific data and/or personalization data is altered or adapted during the installation process. This subset of the SE's installed software may comprise the SE's operating system only, it may also comprise any software or application installed on the SE that may potentially be updated during the SE's life cycle.

After securing specific data and/or personalization data by the update agent during the initial production phase I of the SE, the software image is preferably loaded into the SE in a later phase following the initial production phase of the SE. This increase the flexibility and versatility of secure elements and their applications within electronic devices, while still providing the required security level for personalizing the software, because such software images may then be made operable and/or personalized outside a certified environment of the chip manufacturer.

Preferably, in order to ensure that the specific data and/or personalization data is secured in a trusted state, the securing of specific data and/or personalization data is stopped when the secure element proceeds from the initial production phase to a subsequent phase of the manufacturing process. This ensures that upon an update of an installed software the respective specific data and/or personalization data have not been tampered with.

According to a second aspect of the present invention, there is provided a secure element comprising an installed software, in particular an operating system, and an update agent. The update agent comprises or has access to a specific memory or memory structure in which specific data required for operating the installed software can be or is secured or. In the case, In the moment when the secure element leaves the chip factory, the specific data required for operating the installed software has been secured for later update processes by the update agent.

At a phase subsequent to the chip production phase (referred to in FIG. 1 as phases II, III, or IV), the software image is at some point loaded onto the secure element in order to update the installed software therewith. The update agent is configured to complete the update of the installed software by making the loaded software image operable using the secured specific data.

Preferably, the specific data secured in the update agent's memory structure comprises personalization data of the installed software, particularly secure credentials and/or cryptographic keys by which the installed software has been personalized. That is, the specific or personalization data secured by and in the update agent is a duplicate of or at least comprises the personalization data used to personalize the installed software. Within this context the update agent is configured to update the installed software in that the loaded software image is personalized using the secured personalization data.

In some embodiments, the secure element includes a processor, and memory coupled to the processor, which stores a program module executed by the processor. The program module may include instructions for at least some of the aforementioned operations performed by the secure element, for instance that of the update agent according to the present invention.

According to a third aspect of the present invention, there is provided an update agent for use in a secure element. As already detailed in connection to the first and second aspect, the update agent comprises a memory and is configured to secure specific data required for operating a software installed on the secure element and to make an uploaded software image operable by the secured specific data that represents an update of the installed software. The update agent is preferably designed as a software that can be installed onto and executed by a secure element according to the present invention in order to enable update of a software installed on the secure element.

In some embodiments of the present invention according to any of the forementioned aspects, the update agent is configured upon loading the software image, to perform authentication of the software image using the authentication data stored in a memory of the update agent. Preferably, the secure element, particularly the update agent, authenticates the software image by verifying a digital signature, which may be associated with a vendor of the secure element or with a provider of an electronic device the secure element is embedded on. For instance, the update agent may use an encryption key associated with a particular vendor or device to verify the integrity of the software image. The update agent may also decrypt the software image using authentication data stored in a memory of the update agent, once the software image is loaded onto the secure element.

The update agent is thus a stand-alone entity which is loaded in the factory onto the secure element, and which allows an operating system and/or other trusted software image to be loaded on top of it at any time, even when the secure element, respectively a device the secure element is embedded on, is already deployed in the field. Thus, the update agent allows to directly load a software image or an operating system in the field, that is, outside a certified environment, in order to update a software installed on the secure element.

According to yet a further aspect of the present invention, there is provided a computer-program for use in conjunction with a secure element according to the second aspect in an electronic device in which the secure element is or can be embedded. The computer-program product comprises a non-transitory computer-readable storage medium and a computer-program mechanism embedded therein, to load a software image into the secure element in the electronic device. The computer-program mechanism includes instructions for securing specific data required for operating a software installed on the secure element in a memory, the specific data comprising personalization data the installed software has been personalized with; instructions for receiving a software image to be loaded onto the secure element, the software image representing an update of the installed software; and instructions for making the software image operable by the secured specific data and/or personalizing the software image by the personalization data comprised in the specific data.

It has to be noted that all the devices, elements, units and means described in the present application could be implemented in software or hardware elements or combination thereof. All steps which are performed by the various entities described in the present application as well as the described functionalities are intended to mean that the respective entity is adapted to or configured to perform the respective steps and functionalities.

Further aspects, features and advantages of the present invention will become apparent to those of ordinary skills in the art upon reviewing the following detailed description of preferred embodiments and variants of the present invention in conjunction with the accompanying figures.

BRIEF DESCRIPTION OF THE DRAWINGS

Reference will now be made to the accompanying figures, in which.

DETAILED DESCRIPTION

Figure 1:
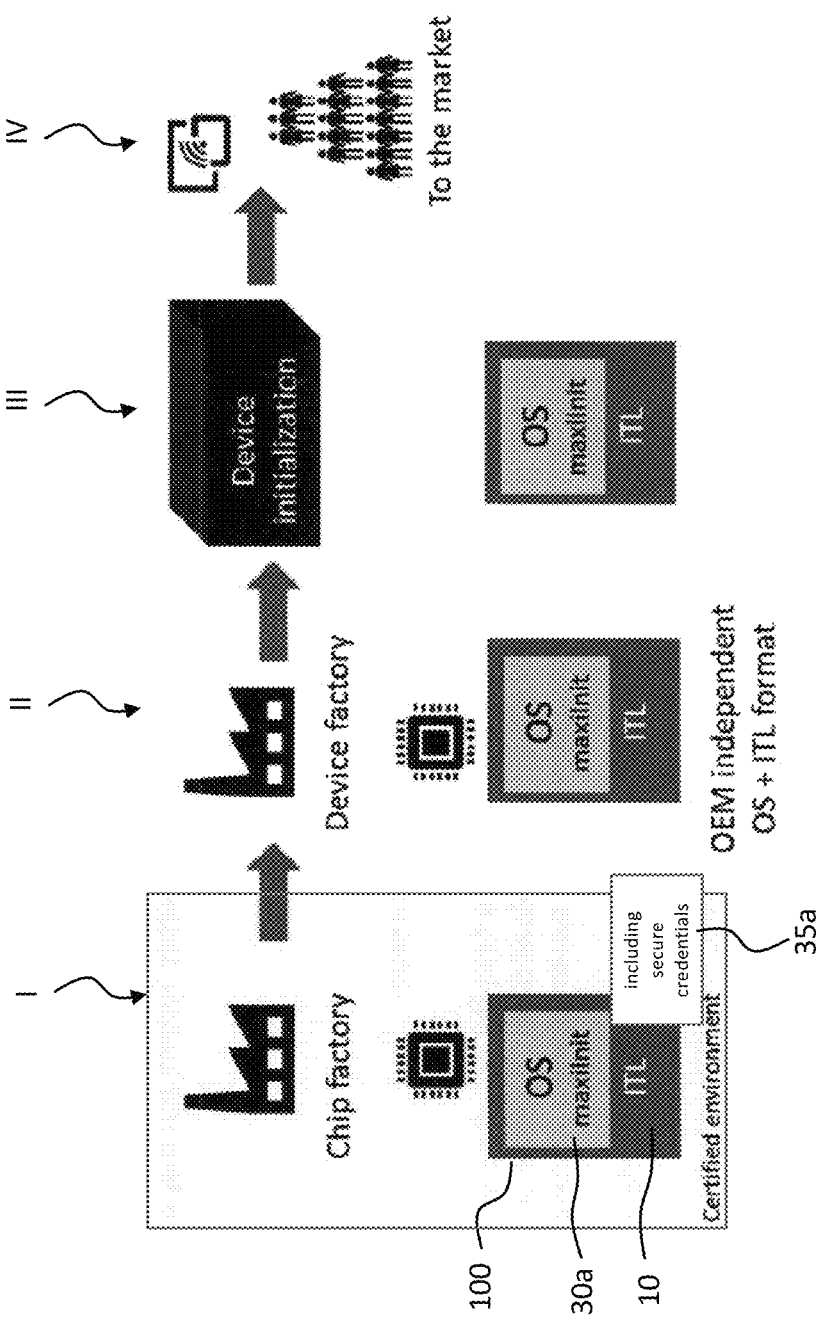
FIG. 1 shows a schematic representation of the conventional production flow of a secure element.

Detailed explanations of the present invention are given below with reference to attached drawings that illustrate specific embodiment examples of the present invention. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the scope of the present invention. In addition, it is to be understood that the position or arrangement of individual elements within each disclosed embodiment may be modified without departing from the scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 2A:
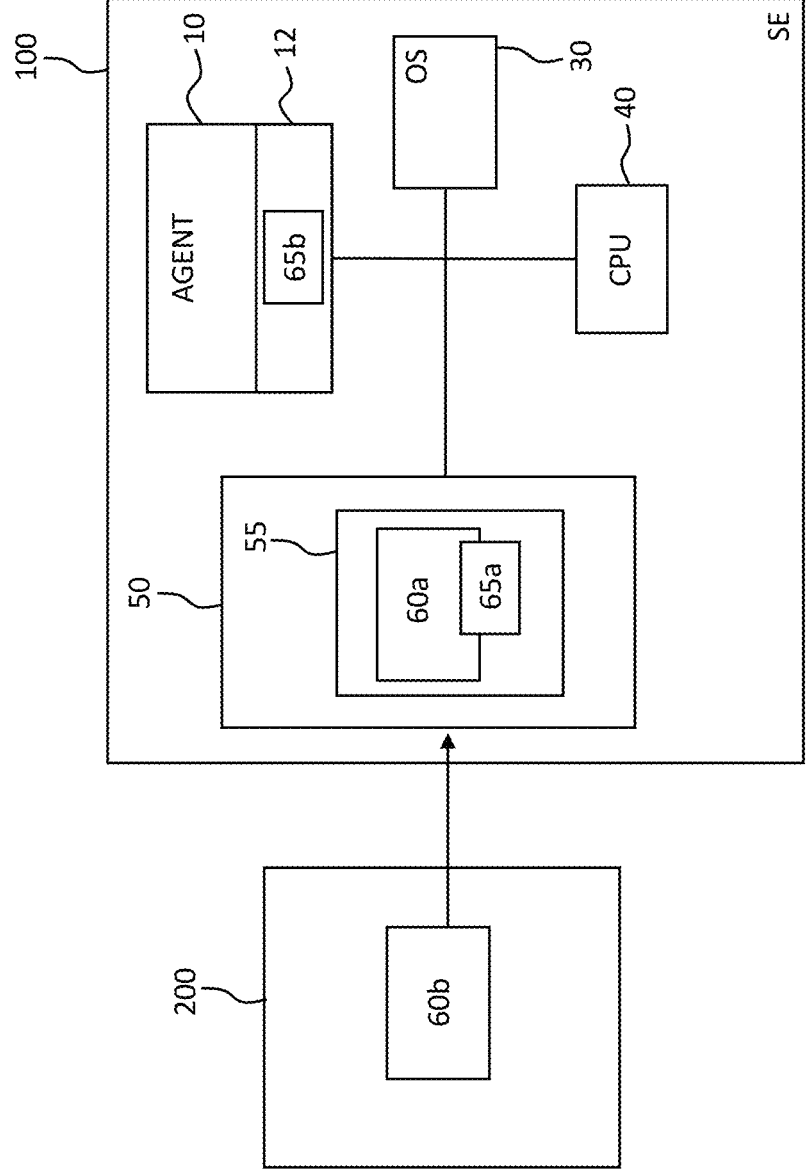
FIG. 2a shows the structure of a secure element according to a first preferred embodiment of the present invention according to which an installed software is updated.
Figure 2B:
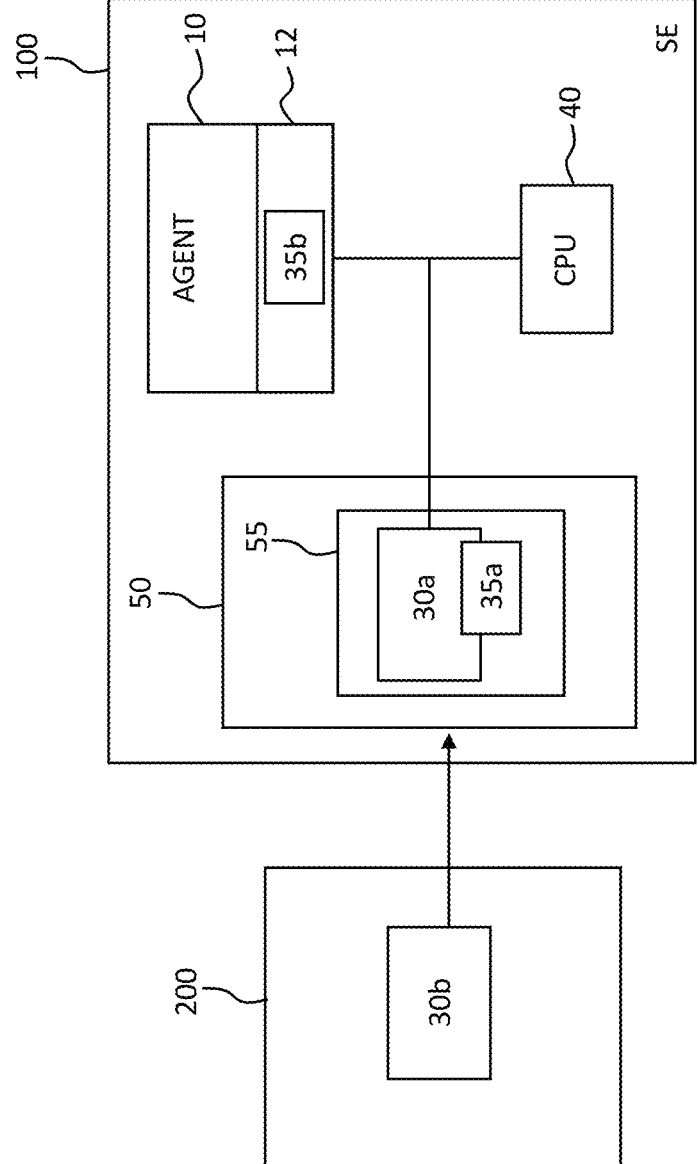
FIG. 2b shows the structure of a secure element according to a second preferred embodiment of the present invention according to which an operating system is updated.
Figure 3:
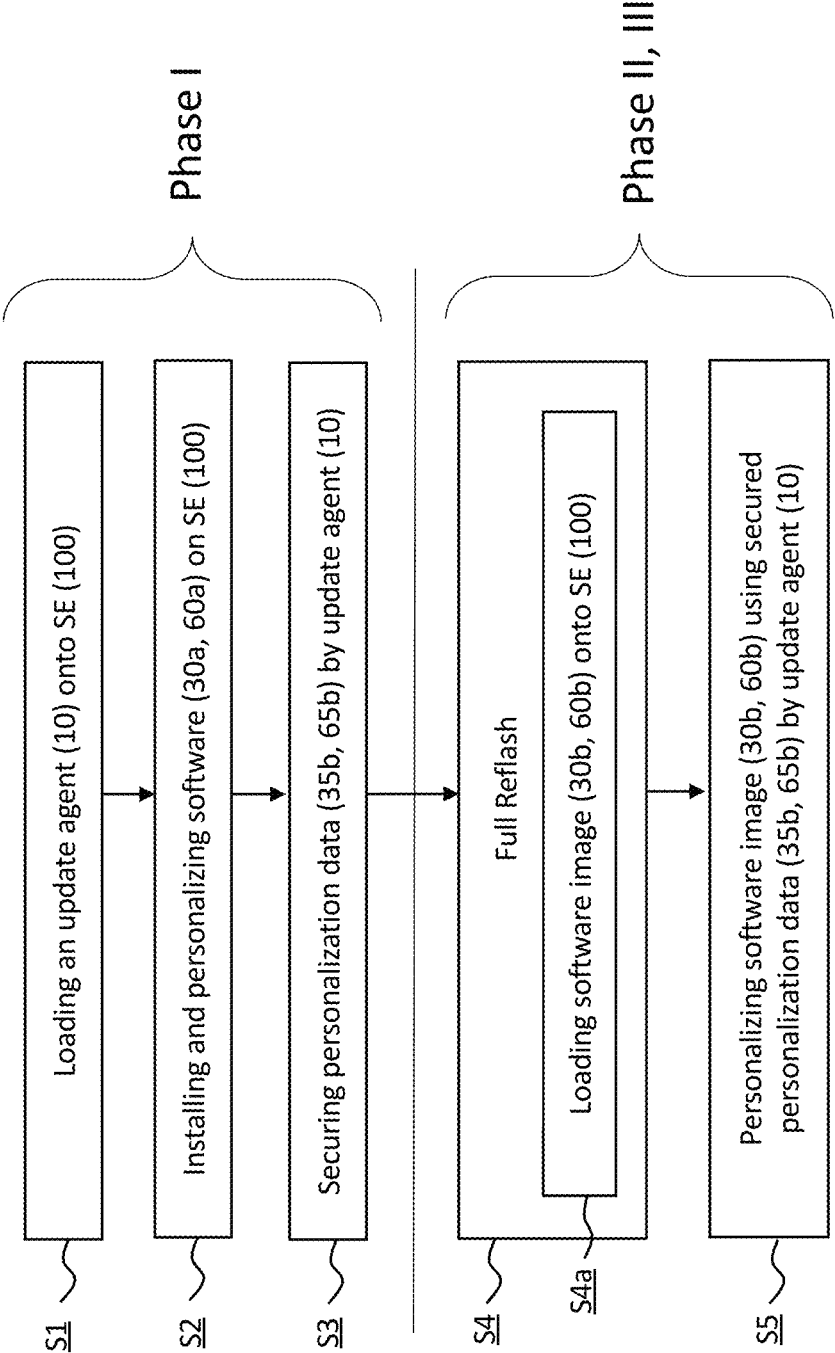
FIG. 3 shows a flow diagram illustrating a method according to the present invention.

FIGS. 2a and 2b show the structure of the secure element, SE, 100 according to two preferred embodiments in greater detail. FIG. 3 shows the steps of the method according to the invention in connection to FIGS. 2a and 2b.

The SE 100 shown in FIG. 2a is a tamper resistant element, containing an update agent 10, an operating system, OS, 30 and a processor, CPU, 40. Both the update agent 10 and the OS 30 may be stored in a memory of the SE 100, such as the non-volatile memory 50. The OS 30 and the update agent 10 are independent entities that can communicate with each other over an appropriate interface, for instance over an Application Programming Interface, API. Memory 50 is a non-volatile memory of the SE 100 that comprises a memory area 55 in which software is stored, which is installed on the SE 100 and executable by the CPU 40. Such installed software may be an executable application or program, identified by reference numeral 60a in FIG. 2a, that provides a certain functionality to the secure element, or may even be the operating system of the secure element 100, identified by reference numeral 30a in FIG. 2b, which, in the present context also is an installed software that may be required to be updated at a certain point of the life cycle of the SE 100. Both the OS 35a of FIG. 2b and the OS 30 of FIG. 2a are standard operating systems of secure elements or smart cards, for example based on the Java Card platform. They are equivalent and the difference between FIGS. 2a and 2b is that the OS 30 of FIG. 2a is in FIG. 2b subject to a software update according to the present invention. The personalized OS 30a of FIG. 2a is identified in FIG. 1 as "maxInit".

The update agent 10 may be a functional part of or realized as a functionality of the operating system 30 or a loader entity allowing the provisioning of software (such as, for instance, use case dependent firmware) within the SE 100. Such loader entities are also referred to as Image Trusted Loader, ITL, in the art. Update agents are the main entities in charge of loading software or software images into the secure element as well as any other procedure related to it, such as update, restore, rollback or the like. In FIGS. 2a and 2b software images to be loaded onto the SE 100 are referred to by reference numerals 60b, identifying an arbitrary software image, and 30b, identifying an operating system image, respectively. The update agent 10, regardless of whether it is realized as an independent entity or as functional part of the operating system 30, is also loaded onto the SE 100 during factory production (see step S1 of FIG. 3), because it reflects a security critical entity of the SE 100 (FIG. 1, phase I).

The update agent 10 may contain its own reserved memory space in form of a memory structure 12, to store sensible data thereon, for instance personalization data and/ or authentication data, the latter being used to authenticate and/or decrypt a software image 30b, 60b before it is personalized. At some point of the personalization process, the memory structure 12 of the update agent 10 may therefore contain personalization data 35b, 65b and the operating system 30 may have access to at least part of the memory structure 12.

According to FIG. 2a, an executable software 60a is installed on the SE 100 in a personalized way. The installed software 60a therefore has personalization data 65a associated therewith, for instance secure credentials and/or cryptographic keys, that ensure that the installed software is an authenticated, trusted and untampered software. The installed software 60a and the personalization data 65a are stored together in the memory area 55 of the SE 100. Within the memory area 55, the installed software 60a and the respective personalization data 65a may be stored in an intertwined fashion, because upon installation the software 60a is equipped or enriched with personalization data 65a in various ways. The software 60a may have been personalized and installed on the SE 100 during factory production of the SE 100 (see step S2 of FIG. 3), because personalization is a security-critical operation that conventionally is performed within a certified environment of a production site of the manufacturer of the SE 100.

FIG. 2b differs over FIG. 2a in that it relates to the case where the installed software is in fact the operating system 30a of the SE 100 itself, having attached therewith individual personalization data 35a. For the reasons outlines above, the operating system 30a is personalized and installed on the SE 100 during factory production of the SE 100 (see step S2 of FIG. 3).

The SE 100 in the state as illustrated in FIGS. 2a and 2b has completed the initial chip production (FIG. 1, phase I) and has left the chip manufacturer's certified environment. In this situation, a copy 65b, 35b of the personalization data 65a, 35a has been secured in the memory structure 12 of the update agent 10 and a software image 60b, 30b is provided by an external server 200 to be loaded onto the secure element 100 in order to update and replace the installed software 60a, 30a. The software image 60b, 30b represents a software update of the installed software 60a or operating system 30a, respectively. The external server 200 may represent an entity which communicates with the SE 100. It can be a LPA (Local Profile Assistant), a terminal, or whatever device it is that the SE may be in connection with. Particularly, the external server 200 is or comprises an image delivery server and provides during a subsequent production phase (FIG. 1, phases II, III, IV) the software image 60b or operating system image 30b to the SE through a customized interface.

FIG. 3 shows a flow chart of the main steps of a method for updating an installed software 60a (see FIG. 2a), for instance an operating system, OS, 30a (see FIG. 2b), in a secure element 100. The steps of the method are described in detail with reference to the SE illustrated in FIG. 2a and FIG. 2b.

The method according to the present invention, as described in the following, is not restricted to any particular type of software or software image. In fact, any secure software or software image that can be installed on and executed by a secure element 100 can be subject to the update method as disclosed herein, for example a firmware or OS of the SE 100 or an applet/application.

Steps S1 to S3 are performed within a certified environment during the factory production phase of the SE 100 to ensure security and authenticity of its software components and data. Steps S4 and S5 represent the software update process that can be performed outside the certified environment of the chip manufacturer, in a subsequent phase II, or III, or even later (see FIG. 1)

With reference to FIG. 3, in a first step S1 performed in the initial chip production phase I, the update agent 10 is loaded onto the SE 100. The update agent 10 reflects a security critical entity of the SE 100 that is loaded onto the SE 100 during factory production.

In a second step S2, software is installed on the SE 100, for example application of other software 60*a* or the operating system 30*a* of the SE 100. Upon installing the software 60*a* or operating system 30*a*, it is personalized by means of respective personalization data 65*a*, 35*b*, respectively. This includes loading both personalization data 65*a*, 35*a*, particularly including secure credentials and cryptographic keys, and the software 60*a* or operating system 30*a* to be installed into the SE 100. By using the credentials and keys 65*a*, 35*a*, the loaded software 60*a* or operating system 60*a* is finally personalized to render an executable software 60*a*, 65*a* or an executable operating system 30*a*, 35*a* installed on the SE 100, the latter referred to as "maxInit" in FIG. 1.

The update agent 10 may facilitate or even conduct step S2 in that it loads personalization data 65*a*, 35*a* into the memory structure 12 and personalizes the software 60*a* or operating system 30*a* using loaded personalization data 65*a*, 35*a*. In effect, the installed software contains the operative software 60*a* plus its specific personalization/configuration 65*a*, including credentials. Likewise, within the context of FIG. 2*b*, the operating system contains the operative system 30*a* plus its specific personalization/configuration 35*a*.

Steps S1 and S2 can be performed sequentially, that is, by means of two or more load commands (e.g., APDU commands), or in one step, in which the update agent 10 is loaded together with the software 60*a*/operating system 30*a* and/or personalization data 65*a*, 35*a* onto the secure element 100.

For enabling an update of the installed software 60*a* or operating system 30*a* outside of the chip manufacturer's certified environment according to the present invention, the update agent 30 secures in step S3 specific, sensitive data of the installed software 60*a* or the operating system 30*a*, for example personalization data 65*a*, 35*a*, in the memory structure 12. Within the context of software 60*a*, 30*a* installed on a secure element 100, such secured specific data 65*b*, 35*b* is characterized in that it is not an integral part of the installed software 60*a* or operating system 30*a* itself but is loaded separately and is required to operate the installed software 60*a* or operating system 60*a*. Within the context of the present invention, the secured specific data 65*b*, 35*b* is also required to render operable or operate any software image 60*b* or operating system image 30*b* that is loaded onto the SE 100 as an update of the installed software 60*a* or operating system 60*a* to replace the same. Particularly, personalization data 65*a*, 35*a* are specific data in the above sense and are secured by the update agent 10 in step S3 as duplicated personalization data 65*b*, 35*b*.

The step S3 of securing specific and/or personalization data 65*b*, 35*b* may be a continuous process within chip production phase I in the course of which specific and/or personalization data 65*b*, 35*b* is secured each time the specific and/or personalization data 65*a*, 35*a* is amended during installation of software 60*a* or operating system 30*a*.

Personalization data 65*b*, 35*b* and other sensitive data specific to and required for operating the secure element 100 and/or a particular installed software 60*a*, such as the operating system 30*a*, is secured by the update agent 10 in step S3, because upon certain types of later updates such data may get lost, for example when particular data regions are updated or particular portions of the memory area 55 are overwritten.

To enable an update of installed software 60*a*, such as an operating system 30*a*, without losing the personalization and thus operability of the software 60*a*, 30*a* to be updated outside of the chip manufacturer's certified environment, such specific data 65*b*, 35*b* is secured in and by the update agent 10 in order to later retrieve it for updating and installing a software image 60*b* or operating system image 30*b* and rendering it operable.

According to the present invention, step S3 is performed only during the production phase of the secure element 100, that is while the secure element 100 is still within the chip manufacturer's certified environment. When the secure element 100 proceeds to a subsequent production phase II, III, or IV according to FIG. 1, secured data 35*b*, 65*b* are preserved in the state it is when the SE 100 leaves production phase I. Therefore the update agent 10 stops securing specific and/or personalization data 65*b*, 35*b* at this point of the production cycle.

Steps S4 and S5 illustrate the actual update of an installed software 60*a* or the installed operating system 30*a* by a software image 60*b* or an operating system image 30*b* in a subsequent production phase II, or III, or later (see FIG. 1).

As a part of step S4, the software image 60*b* or operating system image 30*b* is loaded from an external image server 200 into the memory area 55 of the SE 100 (step S4*a*). Either before the image upload or intrinsically in the course of the image upload the installed software 60*a* or the installed operating system 30*a* is completely deleted from memory area 55 together with all related or associated specific and personalization data 65*a*, 35*a*, respectively. This deletion is sometimes referred to as "Full Reflash" and is required upon software update, because ROM updates are not possible. Upon Full Reflash the memory area 55 is deleted, that is the complete installed software 60*a* or complete installed operating system 30*a* is deleted together with its personalization data 65*a*, 35*a*, such as private credentials and cryptographic keys, and any specific data required to operate the installed software 60*a* or operating system 30*a*.

In step S4*a* the update agent 10 loads the updated software version or operating system version into memory area 55 in the form of the software image 60*b* or operating system image 30*b* provided by the image server 200. Due to the Full Reflash, no specific or personalization data 65*a*, 35*a* is available once the software image 60*b* or operating system image 30*b* is loaded into memory area 55 of the SE 100. At this point the secure element 1000 would conventionally be rendered useless, because any software image 60*b* or operating system image 30*b* would need to be personalized, which conventionally is not possible outside the certified environment of production phase I.

In step S5, the update agent 10 personalizes the loaded software image 60*b* or operating system image 30*b* by specific and personalization data 65*b*, 35*b* previously secured in the memory structure 12 during step S3. Since the specific and personalization data 65*b*, 35*b* represents a duplicate of specific and personalization data 65*a*, 35*a* that has been deleted in the course of the Full Reflash in step S4, the update agent 10 recovers the secured specific and personalization data 65*b*, 35*b* in step S5. As an effect of the data recovery, the recovery the uploaded software image 60*b* or operating system image 30*b* is rendered operable by the secured specific and personalization data 65*b*, 35*b*, for example in that the uploaded software image 60*b* or operating system image 30*b* is personalized using personalization data 65*b*, 35*b*. Therefore, in step S5, the update agent 10 transforms the loaded software image 60*b* or operating system image 30*b* so that is becomes the new, updated and operable software or operating system installed on the SE 100.

At the end of this process, the software image 60*a* or operating system image 30*a* has been personalized by personalization data 65*b*, 35*b*, respectively. In case of updating the operating system 30a by an operating system image 30b, the personalized operating system image is referred to in FIG. 1 as "maxiInit". This means that it contains the operative system plus its specific personalization/configuration, including credentials.

As this update process can be repeated multiple times during the life cycle of the SE 100, each time an installed software 60a or the installed operating system 30a is updated, the update agent 10 performs a Full Reflash followed by a recovery of the specific and personalization data 65b, 35b secured during chip production phase I of the SE 100. By this process, a software image 60b or operating system image 30b uploaded onto the SE 100 in a phase subsequent to the chip production phase I can nevertheless be rendered operable or personalized equally secure, as if it was personalized in the conventional way during production phase I of the secure element 100.

The methods and apparatus as described through the embodiments above, provides an efficient and secure solution for personalizing a trusted software image outside of the certified environment of a chip manufacturer's site. As the software image can be personalized at a later phase and outside the chip manufacturer's environment, a flexible solution for personalizing software at any time during the lifecycle of a secure element is provided.

In the foregoing specification, the invention has been described with reference to specific embodiments thereof. It will, however, be evident that various modifications and changes may be made thereto without departing from the broader scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for updating an installed software, including an operating system, OS, in a secure element, SE, the method comprising:

providing an update agent in the SE, wherein the update agent is a stand-alone entity which is loaded into the SE in a factory production phase;

securing specific data required for operating the installed software in a memory of the update agent;

loading a software image into the SE, the software image representing an update of the installed software;

making the software image operable by the secured specific data.

2. The method according to claim 1, wherein, in the step of securing, specific data which comprises personalization data of the installed software is secured, secure credentials and/or cryptographic keys.

3. The method according to claim 2, wherein the installed software has been personalized with the personalization data and the installed software is updated in that the software image is made operable by personalizing the software image using the personalization data.

4. The method according to claim 1, wherein the installed software is stored together with the specific data in a memory area of the SE and the specific data is secured by reusing and/or copying the specific data from the memory area of the SE to the memory of the update agent.

5. The method according to claim 4, wherein the installed software is deleted together with the specific data by deleting the memory area of the SE prior to loading the software image or as a result of loading the software image into the memory area.

6. The method according to claim 1, wherein the specific data is secured during a production phase of the SE and the software image is loaded and made operable in a subsequent phase after the production phase of the SE.

7. The method according to claim 1, wherein the specific data is secured by the update agent if and when the specific data is altered during a production phase of the SE, wherein the update agent stops securing the specific data if and when the SE proceeds to a subsequent phase after the production phase of the SE.

8. The method according to claim 1, wherein the update agent is provided by loading the update agent into the SE during a production phase of the SE.

9. The method according to claim 1, wherein the specific data comprises cryptographic keys and wherein making the software image operable comprises authenticating the software image using the cryptographic keys.

10. A secure element, comprising an installed software, including an operating system and an update agent, the update agent comprising a memory in which specific data required for operating the installed software is secured and being configured to make a software image operable by the secured specific data, the software image being loaded onto the secure element and representing an update of the installed software, wherein the update agent is a stand alone entity which is loaded into the secure element in a factory production phase.

11. The secure element according to claim 10, wherein the secured specific data comprises personalization data of the installed software, secure credentials and/or cryptographic keys, and the installed software has been personalized with the personalization data, whereas the update agent is configured to update the installed software in that the loaded software image is made operable by personalizing it using the secured personalization data.

12. The secure element according to claim 10, wherein the specific data secured in the memory of the update agent is a reuse and/or copy of specific data stored in a memory area of the secure element together with the installed software.

13. An update agent for use in a secure element, SE, the update agent being a stand-alone entity which is loaded into the SE in a factory production phase, and the update agent comprising a memory and being configured:

to secure specific data required for operating a software installed on the secure element in a memory area of the secure element and to make a software image operable by the secured specific data, the software image being loaded onto the secure element and representing an update of the installed software.

14. The update agent according to claim 13, wherein the update agent is configured to secure specific data comprising personalization data, secure credentials and/or cryptographic keys, by which the installed software has been personalized, and to update the installed software by personalizing the loaded software image using the secured personalization data, whereas the specific data is secured during a production phase of the SE and the installed software is updated in a subsequent phase after the production phase of the SE.

15. The update agent according to claim 13, wherein the update agent is configured to conduct Aa method for updating an installed software, including an operating system, OS, in a secure element, SE, the method comprising:

providing an update agent in the SE;

securing specific data required for operating the installed software in a memory of the update agent;

loading a software image into the SE, the software image representing an update of the installed software;

making the software image operable by the secured specific data;

and/or is realized as an executable software product configured to be installed on a security element, comprising an installed software, including an operating system and an update agent, the update agent comprising a memory in which specific data required for operating the installed software is secured and being configured to make a software image operable by the secured specific data, the software image being loaded onto the secure element and representing an update of the installed software;

and to be executed by a processor of the security element.

16. A computer-program product for use in conjunction with a secure element in an electronic device, the computer-program product comprising a non-transitory computer-readable storage medium and a computer-program mechanism embedded therein, to load a software into the secure element in the electronic device, the computer-program mechanism being a stand-alone entity which is loaded into the secure element in a factory production phase, and the computer-program mechanism including:

instructions for securing specific data required for operating a software installed on the secure element in a memory area, the specific data comprising personalization data the installed software has been personalized with;

instructions for receiving a software image to be loaded onto the secure element, the software image representing an update of the installed software; and instructions for making the software image operable by the secured specific data and/or personalizing the software image by the personalization data comprised in the memory area.

* * * * *